United States Patent
Ota et al.

[11] Patent Number: 5,913,377
[45] Date of Patent: Jun. 22, 1999

[54] TRACTION CONTROL SYSTEM FOR A FOUR-WHEEL DRIVE VEHICLE

[75] Inventors: Toshinobu Ota, Ama gun; Hiroyuki Nagai, Nagoya; Yousuke Takahira, Toyota, all of Japan

[73] Assignees: Aisin Seiki Kabushiki Kaisha, Kariya; Toyota Jidosha Kabushiki Kaisha, Toyota, both of Japan

[21] Appl. No.: 09/025,421

[22] Filed: Feb. 18, 1998

[30] Foreign Application Priority Data

Feb. 20, 1997 [JP] Japan .................................... 9-053826

[51] Int. Cl.⁶ ................................................. B60R 17/356
[52] U.S. Cl. ............................ 180/244; 180/197; 701/70; 701/78; 303/113.2
[58] Field of Search ..................... 180/244, 197; 701/70, 78, 82, 83, 76; 303/139, 113.2, 113.4

[56] References Cited

U.S. PATENT DOCUMENTS

| | | | |
|---|---|---|---|
| 4,762,376 | 8/1988 | Matsubara | 303/139 |
| 4,872,730 | 10/1989 | Takagi et al. | 303/113.2 |
| 4,884,650 | 12/1989 | Fujiki et al. | 180/197 |
| 4,900,105 | 2/1990 | Burgdorf et al. | 180/197 |
| 5,407,257 | 4/1995 | Iwata | 303/113.2 |
| 5,547,266 | 8/1996 | Beck et al. | 303/113.2 |
| 5,782,543 | 7/1998 | Monzaki et al. | 303/139 |

FOREIGN PATENT DOCUMENTS 7-125623  5/1995  Japan .
8-133054  5/1996  Japan .

*Primary Examiner*—Lanna Mai
*Assistant Examiner*—L. Jasmin
*Attorney, Agent, or Firm*—Burns, Doane, Swecker & Mathis, L.L.P.

[57] ABSTRACT

The present invention is directed to a traction control system for a four-wheel drive vehicle, which includes a braking operation detector for detecting operation of a brake pedal, an accelerating operation detector for detecting operation of an accelerator pedal, and a slip detector for detecting a slip of each wheel of the vehicle. A braking force controller is provided for controlling a pressure control apparatus to perform a traction control by supplying the hydraulic braking pressure discharged from an auxiliary pressure source to wheel brake cylinders operatively mounted on the wheels under a slip condition, when the accelerating operation detector detects the operation of the accelerator pedal and the slip detector detects the slip of at least one of the wheels. The braking force controller is adapted to control the pressure control apparatus to communicate all of the wheel brake cylinders with a hydraulic pressure generator such as a master cylinder, when the braking operation detector detects the operation of the brake pedal on condition that the traction control is being performed, with the communication between the pressure generator and all of the wheel brake cylinders blocked. Accordingly, when the brake pedal is depressed during the traction control, or immediately thereafter, the braking operation is effectively initiated.

6 Claims, 10 Drawing Sheets

TRACTION CONTROL SYSTEM FOR A FOUR-WHEEL DRIVE VEHICLE

BACKGROUND OF THE INVENTION

1. Field of the Invention

The present invention relates to a traction control system for controlling a braking force applied to each driven wheel of an automotive vehicle having four driven wheels, and more particularly to the control system which prevents each wheel from slipping which will occur during, for example, accelerating the vehicle, by applying a braking force to each wheel of the vehicle in accordance with the slipping condition of the wheel.

2. Description of the Related Arts

An ordinary passenger vehicle has a pair of wheels at each of its front and rear sides. Either the front wheels or the rear wheels of that vehicle are operatively connected with an engine to be driven directly thereby, while the rest of the wheels are not connected with the engine so as to be served as non-driven wheels. A vehicle having the driven wheels at its front side is called a front drive vehicle, while a vehicle having the driven wheels at its rear side is called a rear drive vehicle. Whereas, a vehicle having the driven wheels at both of the front and rear sides is called a four-wheel drive (4WD) vehicle. As for a driving system of the four-wheel drive vehicle, various types of the system are known, such as a part time system, full time system, and the like. According to the full time system, the front driven wheels and rear driven wheels are connected by a differential gear mechanism, i.e., so called a center differential gear.

Also, in order to prevent an acceleration slip from occurring in the case where an excessive driving force is applied when starting or accelerating the vehicle, an acceleration slip control system, i.e., the traction control system is getting popular in the market, as disclosed in a Japanese Patent Laid-open Publication No.8-133054, for example.

In the case where the traction control system is applied to the four-wheel drive vehicle, however, there may be such a case that hydraulic braking pressure is supplied from an auxiliary pressure source to each wheel brake cylinder, with the communication between a master cylinder and all of the wheel brake cylinders blocked, and controlled in response to the slip condition of the wheel. This is the case where all of the wheels are under the acceleration slip, for example. In this case, however, when a vehicle driver depresses a brake pedal and an accelerator pedal simultaneously, or when the driver depresses the brake pedal immediately after he released the accelerator pedal, it will be difficult for him to obtain an expected stroke of the brake pedal, so that a feeling in his braking operation will be deteriorated. Furthermore, if the hydraulic braking pressure in the wheel brake cylinder was relatively high, when the traction control was terminated, that hydraulic braking pressure would be applied to the master cylinder immediately after the termination of the traction control. Therefore, some components of the master cylinder might be damaged, if an excessive load was applied thereto by the hydraulic braking pressure returned from the wheel brake cylinder.

SUMMARY OF THE INVENTION

Accordingly, it is an object of the present invention to provide a traction control system for use in a four-wheel drive vehicle, wherein even if a brake pedal was depressed during a traction control, or immediately after the traction control was terminated, the braking operation would be effectively initiated without deteriorating its feeling.

In accomplish the above and other objects, a traction control system is provided for a four-wheel drive vehicle, wherein wheel brake cylinders are operatively mounted on the front and rear wheels, respectively, for applying a braking force thereto, and a hydraulic pressure generator is provided for supplying a hydraulic braking pressure to each of the wheel brake cylinders in response to operation of a brake pedal. An auxiliary pressure source is provided for generating the hydraulic braking pressure independently of the hydraulic pressure generator. A hydraulic braking pressure control apparatus is disposed between the wheel brake cylinders and both of the hydraulic pressure generator and the auxiliary pressure source so as to control the hydraulic braking pressure in each wheel brake cylinder. Braking operation detection means is provided for detecting operation of the brake pedal. Accelerating operation detection means is provided for detecting operation of an accelerator pedal of the vehicle. Slip detection means is provided for detecting a slip of each wheel of the vehicle. And, braking force controlling means is provided for controlling the hydraulic braking pressure control apparatus to perform a traction control by supplying the hydraulic braking pressure discharged from the auxiliary pressure source to the wheel brake cylinders mounted on the wheels under a slip condition, when the accelerating operation detection means detects the operation of the accelerator pedal and the slip detection means detects the slip of at least one of the wheels. The braking force controlling means is adapted to control the hydraulic braking pressure control apparatus to communicate all of the wheel brake cylinders with the hydraulic pressure generator, when the braking operation detection means detects the operation of the brake pedal on condition that the traction control is being performed, with the communication between the pressure generator and all of the wheel brake cylinders blocked.

It is preferable that the hydraulic pressure generator includes a master cylinder for supplying the hydraulic braking pressure to each of the wheel brake cylinders in response to operation of the brake pedal, and the braking operation detection means includes a pressure sensor for detecting the hydraulic braking pressure discharged from the master cylinder. The braking operation detection means is adapted to detect the operation of the brake pedal by the pressure sensor, when the hydraulic braking pressure detected thereby exceeds a predetermined pressure.

The braking operation detection means may include depressing force detection means for detecting a depressing force applied to the brake pedal, and may be adapted to detect the operation of the brake pedal by the depressing force detection means, when the depressing force detected thereby exceeds a predetermined force.

The hydraulic pressure generator may include a master cylinder for supplying the hydraulic braking pressure to each of the wheel brake cylinders in response to operation of the brake pedal, and a regulator for regulating the hydraulic pressure discharged from the auxiliary pressure source in response to operation of the brake pedal. The wheel brake cylinders are arranged to provide a front and rear dual circuit system, and one circuit thereof may be communicated with the master cylinder, and the other one circuit thereof may be communicated with the regulator. The braking force controlling means is preferably adapted to control the braking pressure control apparatus to communicate the other one circuit with the regulator at first, and with a predetermined time elapsed thereafter, communicate the one circuit with the master cylinder, when the braking operation detection means detects the operation of the brake pedal on condition that the traction control is being performed, with the communication between the pressure generator and all of the wheel brake cylinders blocked.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
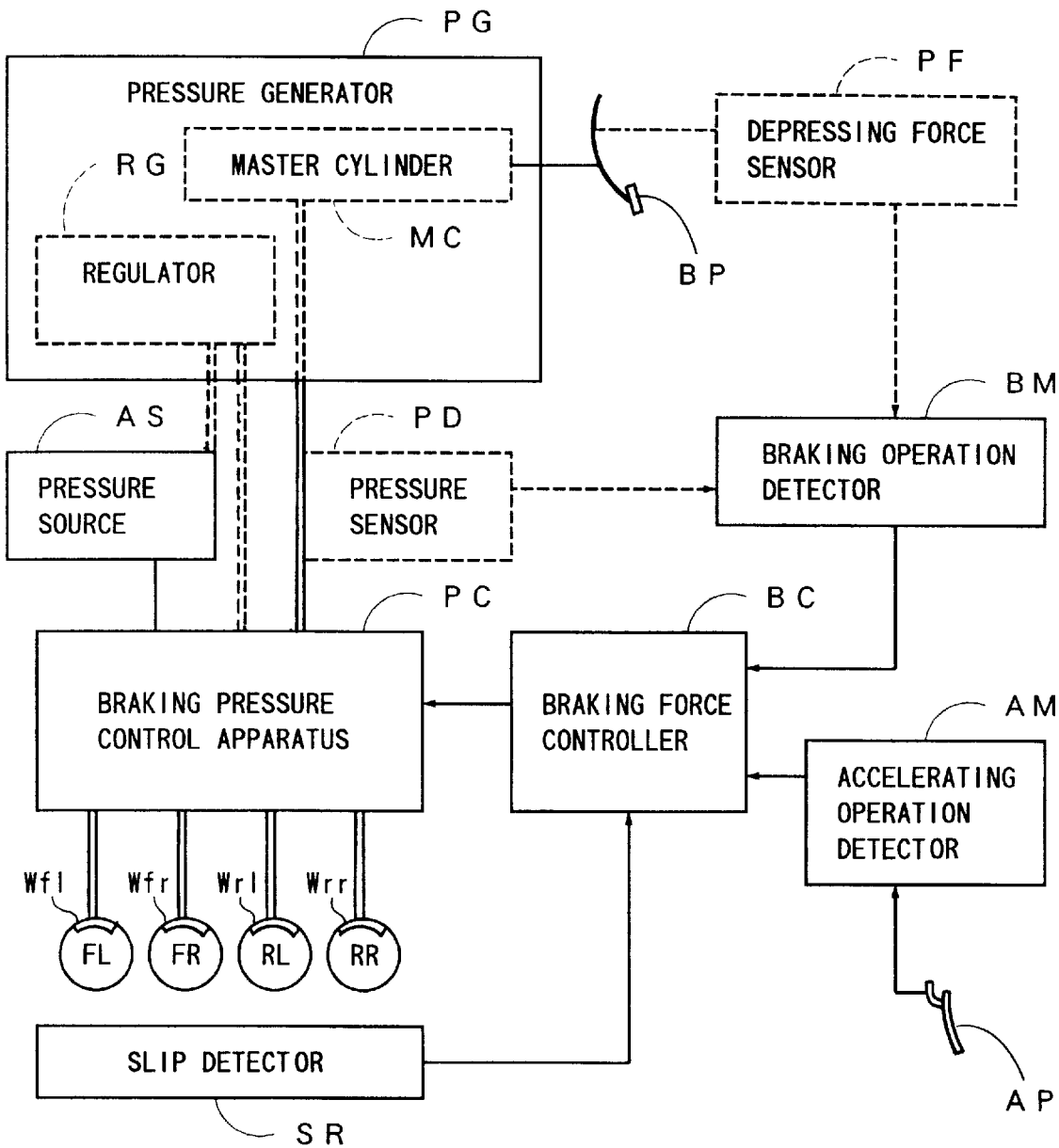
FIG. 1 is a general block diagram illustrating a traction control system according to an embodiment of the present invention.

Referring to FIG. 1, there is schematically illustrated a traction control system for a four-wheel drive vehicle according to an embodiment of the present invention, wherein wheel brake cylinders Wfl, Wfr, Wrl, Wrr are operatively mounted on front and rear wheels FL, FR, RL, RR, respectively, for applying a braking force thereto. A hydraulic pressure generator PG is provided for supplying a hydraulic braking pressure to each of the wheel brake cylinders in response to operation of a brake pedal BP. An auxiliary pressure source AS is provided for generating the hydraulic braking pressure independently of the hydraulic pressure generator PG. A hydraulic braking pressure control apparatus PC is disposed between the wheel brake cylinders and both of the hydraulic pressure generator PG and the auxiliary pressure source AS so as to control the hydraulic braking pressure in each wheel brake cylinder. A braking operation detector BM is provided for detecting operation of the brake pedal BP. An accelerating operation detector AM is provided for detecting operation of an accelerator pedal AP of the vehicle. A slip detector SR is provided for detecting a slip of each wheel of the vehicle. And, a braking force controller BC is provided for controlling the pressure control apparatus PC to perform a traction control by supplying the hydraulic braking pressure discharged from the auxiliary pressure source AS to the wheel brake cylinders mounted on the wheels under a slip condition, when the accelerating operation detector AM detects the operation of the accelerator pedal AP and the slip detector SR detects the slip of at least one of the wheels. The braking force controller BC is adapted to control the pressure control apparatus PC to communicate all of the wheel brake cylinders with the hydraulic pressure generator PG, when the braking operation detector BM detects the operation of the brake pedal BP on condition that the traction control is being performed, with the communication between the pressure generator PG and all of the wheel brake cylinders blocked.

As indicated by broken lines in FIG. 1, the hydraulic pressure generator PG may include a master cylinder MC, and the braking operation detector BM may include a pressure sensor PD for detecting the hydraulic braking pressure discharged from the master cylinder MC. According to this braking operation detector BM, therefore, the operation of the brake pedal BP can be detected by the pressure sensor PD, when the hydraulic braking pressure detected thereby exceeds a predetermined pressure. Or, the braking operation detector BM may include a depressing force sensor PF for detecting a depressing force applied to the brake pedal BP. According to this braking operation detector BM, the operation of the brake pedal BP can be detected by the depressing force sensor PF, when the depressing force detected thereby exceeds a predetermined force, as indicated by the broken lines in FIG. 1.

Also, as indicated by the broken lines in FIG. 1, the hydraulic pressure generator PG may further include a regulator RG for regulating the hydraulic pressure discharged from the auxiliary pressure source AS in response to operation of the brake pedal BP. The wheel brake cylinders may be arranged to provide a front and rear dual circuit system, and one circuit thereof may be communicated with the master cylinder MC, while the other one circuit may be communicated with the regulator RG. In this embodiment, the braking force controller BC is adapted to control the braking pressure control apparatus PC to communicate the other one circuit with the regulator RG at first, and with a predetermined time elapsed thereafter, communicate the one circuit with the master cylinder MC, when the braking operation detector BM detects the operation of the brake pedal BP on condition that the traction control is being performed, with the communication between the pressure generator PG and all of the wheel brake cylinders blocked.

Figure 2:
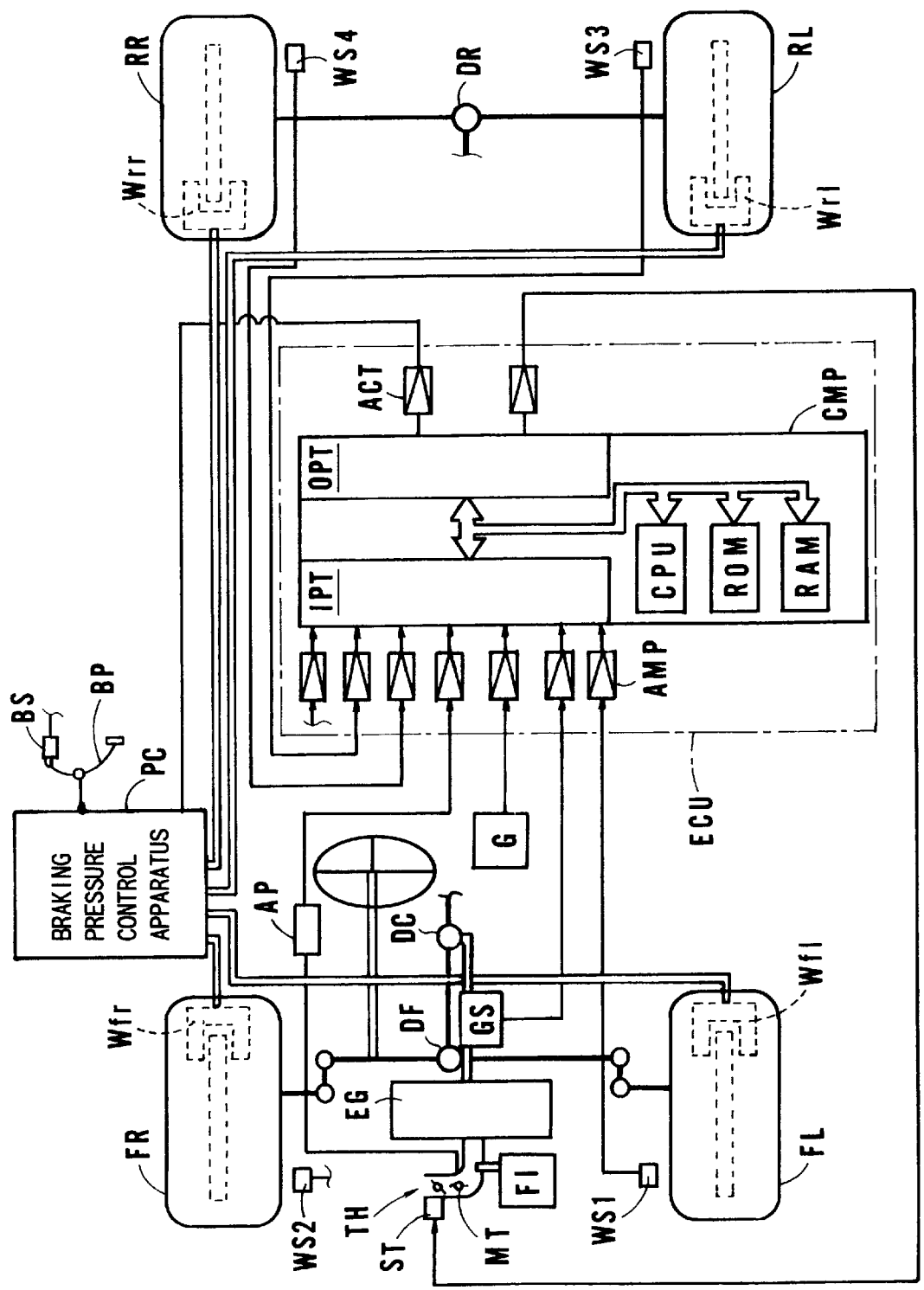
FIG. 2 is a schematic block diagram of a vehicle including the traction control system of the above embodiment.
Figure 3:
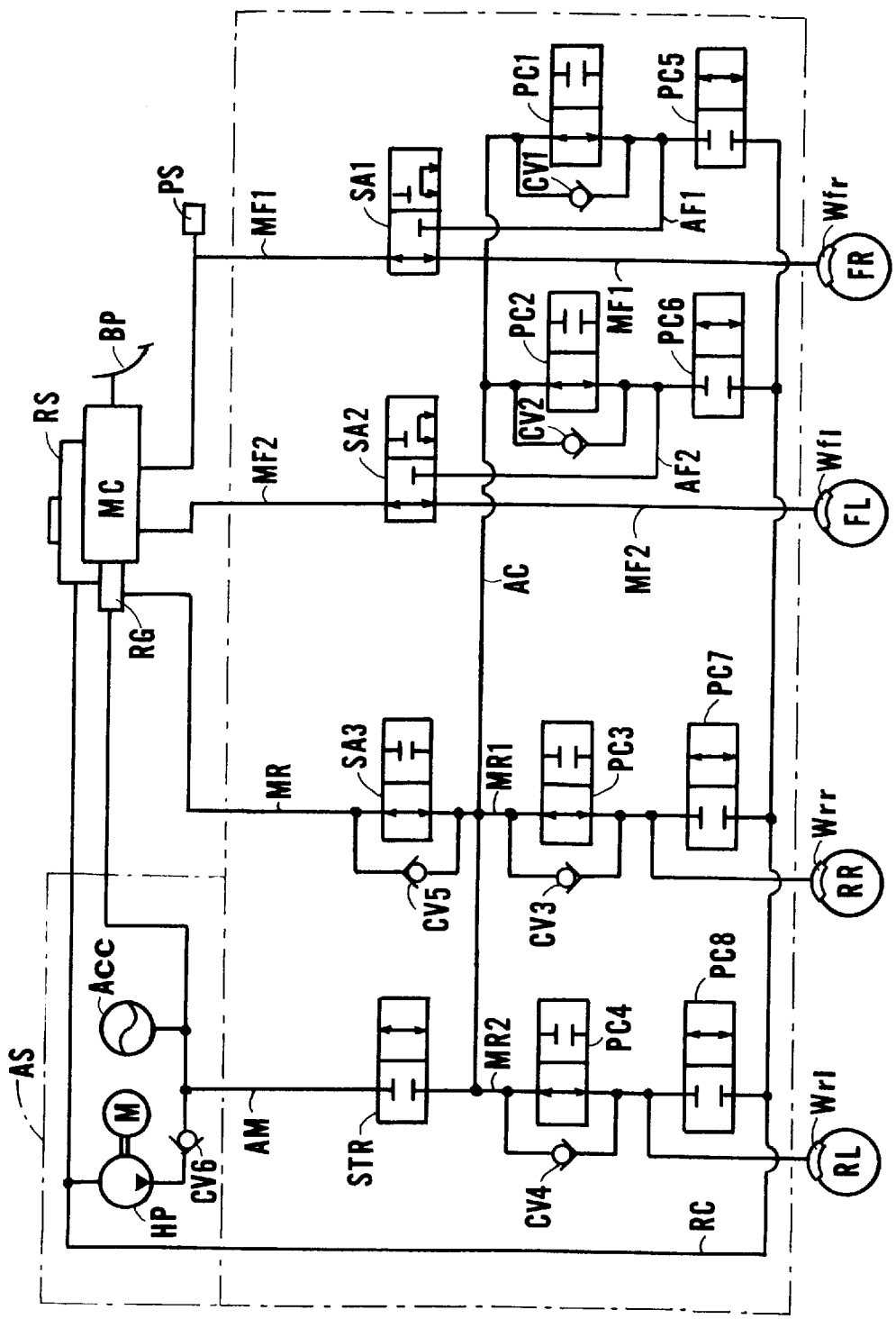
FIG. 3 is a block diagram illustrating an embodiment of a hydraulic braking pressure control apparatus for use in the above embodiment.

More specifically, the details of the embodiment disclosed in FIG. 1 are illustrated in FIGS. 2 to 17. As shown in FIG. 2 the vehicle has an engine EG provided with a fuel injection apparatus FI and a throttle control apparatus TH which is arranged to control a main throttle opening of a main throttle valve MT in response to operation of an accelerator pedal AP. In FIG. 2, the throttle control apparatus TH has a sub-throttle valve ST, which is actuated in response to an output signal of an electronic controller ECU to control a sub-throttle opening. Also, the fuel injection apparatus FI is actuated in response to an output signal of the electronic controller ECU to control the fuel injected into the engine EG. The wheel FL designates the wheel placed at the front left side as viewed from the position of a driver's seat, the wheel FR designates the wheel at the front right side, the wheel RL designates the wheel at the rear left side, and the wheel RR designates the wheel at the rear right side. With respect to a braking system according to the present embodiment, the wheel brake cylinders Wfl, Wfr, Wrl, Wrr are operatively mounted on the front wheels FL, FR and rear wheels RL, RR of the vehicle, respectively, and fluidly connected to the hydraulic braking pressure control apparatus PC. The pressure control apparatus PC in the present embodiment may be arranged as illustrated in FIG. 3 which will be explained later in detail. According to the present embodiment, the engine EG is operatively connected with the front wheels FL, FR through a front differential gear DF, and connected with the rear wheels RL, RR through a transmission GS, a center differential gear DC and a rear differential gear DR to provide the four-wheel drive system.

As shown in FIG. 2, at the wheels FL, FR, RL and RR, there are provided wheel speed sensors WS1 to WS4 respectively, which are connected to an electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed and turns off when the brake pedal BP is released, an acceleration sensor G for detecting a vehicle acceleration, and the like. These are electrically connected to the electronic controller ECU, which also receive signals from a throttle sensor (not shown) for detecting opening angles of the main throttle valve MT and sub-throttle valve ST. The operation of the accelerator pedal AP can be detected on the basis of the signals output from the throttle sensor, while a sensor for directly detecting the operation of the accelerator pedal AP may be installed.

The electronic controller ECU is provided with a microcomputer CMP which includes a central processing unit or CPU, a read-only memory or ROM, a random access memory or RAM an input port IPT, and an output port OPT, and the like, as shown in FIG. 2. The signals detected by each of the wheel speed sensors WS1 to WS4, brake switch BS, acceleration sensor G, and the like are fed to the input port IPT via respective amplification circuits AMP and then to the central processing unit CPU. The control signals are fed from the output port OPT to the throttle control apparatus TH and hydraulic pressure control apparatus PC via the respective driving circuits ACT. In the microcomputer CMP, the read-only memory ROM memorizes a program corresponding to flowcharts shown in FIGS. 4 to 12, the central processing unit CPU executes the program while the ignition switch (not shown) is closed, and the random access memory RAM temporarily memorizes variable data needed to execute the program.

FIG. 3 shows the hydraulic braking pressure system, wherein the hydraulic circuits are divided into the front hydraulic circuit and the rear hydraulic circuit to form a front and rear dual circuit system according to the present embodiment. The pressure generator according to the present embodiment includes a master cylinder MC and a regulator RG, which are activated in response to depression of the brake pedal BP. The regulator RG is connected to an auxiliary pressure source AS, both of which are connected to a low-pressure reservoir RS, to which the master cylinder MC is connected, as well. The auxiliary pressure source AS includes a hydraulic pressure pump HP and an accumulator Acc. The pump HP is driven by an electric motor M to pressurize a brake fluid in the reservoir RS to discharge the pressurized brake fluid, or hydraulic braking pressure through a check valve CV6, into the accumulator Acc to accumulate it therein. The electric motor M starts to operate when the pressure in the accumulator Acc is decreased to be less than a predetermined lower limit, and stops when the pressure in the accumulator Acc is increased to exceed a predetermined upper limit. Accordingly, it is so arranged that a so-called power pressure be properly supplied from the accumulator Acc to the regulator RG. The regulator RG introduces the hydraulic braking pressure discharged from the auxiliary pressure source AS and regulates it to a regulator pressure in proportion to a pilot pressure discharged from the master cylinder MC. The structure of the regulator RG is well known in the art, so that explanation thereof is omitted. A part of the regulator pressure is used for assisting the operation of the master cylinder MC.

In hydraulic pressure passages MF1, MF2 for connecting the master cylinder MC with the front wheel brake cylinders Wfr, Wfl, respectively, disposed are solenoid valves SA1 and SA2 which are connected to solenoid valves PC1, PC5 and solenoid valves PC2, PC6, through passages AF1 and AF2, respectively. In the hydraulic pressure passage MF1 (or MF2), a pressure sensor PS is provided for detecting the hydraulic pressure output from the master cylinder MC. A solenoid valve SA3 is disposed in a passage MR which is provided for connecting the regulator RG to the wheel brake cylinders Wrr, Wrl and so on, and which is divided into passages MR1, MR2, in which solenoid valves PC3, PC7 and solenoid valves PC4, PC8 for use in the control of discharging and draining the brake fluid are disposed. Then, the auxiliary pressure source AS is connected to the downstream side of the solenoid valve SA3 through a passage AM, in which a solenoid valve STR is disposed. The solenoid valve STR is of a two-port two-position solenoid operated valve, which is normally closed and activated to communicate the solenoid valves PC1–PC4 directly with the accumulator Acc. The solenoid valves SA1 and SA2 are of a three-port two-position solenoid operated valve which is placed in a first operating position as shown in FIG. 3, when it is not energized, through which each of the wheel brake cylinders Wfr and Wfl is communicated with the master cylinder MC. When the solenoid valves SA1 and SA2 are energized, they are placed in their second operating positions, respectively, where both of the wheel brake cylinders Wfr and Wfl are prevented from communicating with the master cylinder MC, while the wheel brake cylinder Wfr is communicated with the solenoid valves PC1 and PC5, and the wheel brake cylinder Wfl is communicated with the solenoid valves PC2 and PC6, respectively. The solenoid valves PC5 and PC6 are connected to the reservoir RS through a passage RC. In parallel with the solenoid valves PC1 and PC2, check valves CV1 and CV2 are disposed, respectively. The inlet side of the check valve CV1 is connected to the passage AF1 and the inlet side of the check valve CV2 is connected to the passage AF2. The check valve CV1 is provided for allowing the flow of the brake fluid toward the regulator RG and preventing the reverse flow. In the case where the solenoid valve SA1 is energized to be placed in its second position, therefore, if the brake pedal BP is released, the hydraulic braking pressure in the wheel brake cylinder Wfr is rapidly reduced to the pressure discharged from the regulator RG. The check valve CV2 is provided in the same manner as the check valve CV1.

With respect to the rear hydraulic circuit, the solenoid valve SA3 is of a two-port two-position solenoid operated valve, which is normally opened as shown in FIG. 3, so that the solenoid valves PC3 and PC4 are communicated with the regulator RG. In this case, the solenoid valve STR is placed in its closed position to shut off the communication with the accumulator Acc. When the solenoid valve SA3 is energized, it is placed in its closed position, where both of the solenoid valves PC3 and PC4 are prevented from communicating with the regulator RG, while the solenoid valves PC3 and PC4 (and, solenoid valves PC1 and PC2) are communicated with the accumulator Acc when the solenoid valve STR is energized. In parallel with the solenoid valves PC3 and PC4, check valves CV3 and CV4 are disposed, respectively. The inlet side of the check valve CV3 is connected to the wheel brake cylinder Wrr, and the inlet side of the check valve CV4 is connected to the wheel brake cylinder Wrl, respectively. The check valves CV3 and Cv4 are provided for allowing the flow of the brake fluid toward the solenoid valve SA3 and preventing the reverse flow. Therefore, the hydraulic braking pressure in each of the wheel brake cylinders Wrr, Wrl is rapidly reduced to the pressure discharged from the regulator RG. Furthermore, the check valve CV5 is disposed in parallel with the solenoid valve SA3 so that the brake fluid may be supplied from the regulator RG to the solenoid valves PC1–PC4 through the check valve CV5 in response to depression of the brake pedal BP, even when the solenoid valve SA3 is placed in its closed position.

The above-described solenoid valves SA1, SA2, SA3, STR, and PC1–PC8 are controlled by the electronic controller ECU to provide various control modes including the traction control mode, as will be described hereinafter. The motor M drives the pump HP, so that the power pressure is accumulated in the accumulator Acc. The solenoid valves are placed in their normal positions as shown in FIG. 3. When the brake pedal BP is depressed, the master cylinder pressure is discharged from the master cylinder MC, and the regulator pressure is discharged from the regulator RG, and supplied to the wheel brake cylinders Wfr-Wrl through the solenoid valves SA1, SA2, SA3 and PC1–PC4.

When the traction control is initiated to start an anti-slip control operation for the wheel FR under the accelerating operation, for example, the solenoid valve SA1 is changed to its second operating position, and the solenoid valves PC3, PC4 connected to the rear wheel brake cylinders Wrr, Wrl and the solenoid valve SA3 are placed in their closed positions, while the solenoid valves STR and PC1 are placed in their open positions. As a result, the power pressure accumulated in the accumulator Acc is supplied to the wheel brake cylinder Wfr through the solenoid valve STR placed in its open position. Then, if the solenoid valve PC1 is placed in its closed position, the pressure in the wheel brake cylinder Wfr is held. Accordingly, when the solenoid valve PC1 is opened and closed alternately, with the solenoid valve PC5 held in its closed position, the hydraulic braking pressure in the wheel brake cylinder Wfr is increased and held repeatedly like pulses thereby to be increased gradually. If the solenoid valve PC5 is placed in its open position, the wheel brake cylinder Wfr is connected to the reservoir RS through the passage RC, so that the brake fluid in the wheel brake cylinder Wfr is returned to the reservoir RS. Thus, with the solenoid valves PC1 and PC5 opened or closed alternately in response to the slip condition of the wheel FR under the accelerating operation, one of the pressure modes including pressure increase, pressure decrease and hold modes is performed with respect to the wheel brake cylinder Wfr. Whereby, the braking force is applied to the wheel FR to limit its rotating force, so that the accelerating slip is effectively prevented to perform the traction control properly. Likewise, the anti-slip control is performed with respect to the wheel FL.

On the other hand, during the braking operation, when the wheel FR tends to be locked for example, and the anti-skid control is initiated, the solenoid valve SA1 is changed to its second operating position, and the solenoid valve PC1 is placed in its closed position, while the solenoid valve PC5 is placed in its open position. As a result, the brake fluid in the wheel brake cylinder Wfr is drained into the reservoir RS to reduce the pressure in the wheel brake cylinder Wfr. When a gradual increase mode is selected for the wheel brake cylinder Wfr, the solenoid valve PC5 is placed in its closed position and the solenoid valve PC1 is in its open position, so that the regulator pressure is supplied from the regulator RG through the solenoid SA3 and a passage AC, and then the solenoid valve PC1 in its open position and the solenoid valve SA1 in its second position. Then, the solenoid valve PC1 is opened and closed alternately, so that the pressure in the wheel brake cylinder Wfr is increased and held repeatedly like pulses thereby to be increased gradually. When a rapid increase mode is selected for the wheel brake cylinder Wfr, the solenoid valves PC1, PC5 are placed in the normal positions as shown in FIG. 3, and then the solenoid valve SA1 is placed in its first position, so that the master cylinder pressure is supplied from the master cylinder MC. With respect to the rear wheels RR, RL, the solenoid valves PC3, PC4, PC7 and PC8 are operated to perform the anti-skid control in the same manner as described above.

Figure 4:
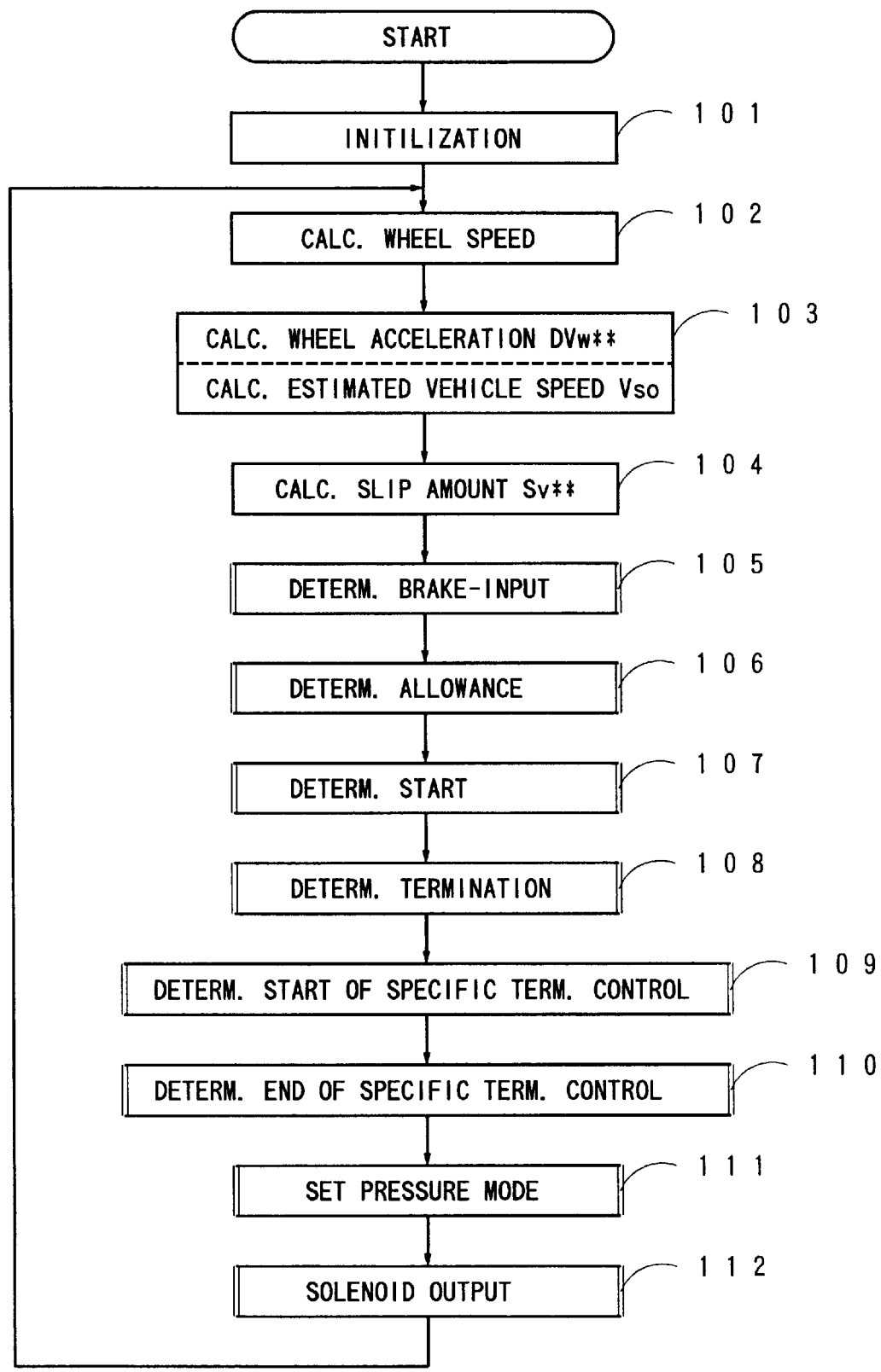
FIG. 4 is a flowchart showing a main routine of the traction control according to the above embodiment of the present invention.

According to the present embodiment as constituted above, a program routine for the traction control or the like is executed by the electronic controller ECU, as will be described hereinafter with reference to FIGS. 4 to 12. The program routine starts when an ignition switch (not shown) is turned on. At the outset, the program for the traction control as shown in FIG. 4 provides for initialization of the system at Step 101 to clear various data. At Step 102, the signals detected by the wheel speed sensors WS1 to WS4 are read by the electronic controller ECU, and the wheel speed $Vw^{}$ ($$ represents one of the wheels FL, FR, RL, RR) of each wheel is calculated, and differentiated to provide the wheel acceleration $DVw^{}$. The minimum value of the wheel speeds $Vw^{}$ for four wheels is calculated to provide an estimated vehicle speed $Vso$ ($Vso=MIN[Vw^{}]$) at step 103. At Step 104, also calculated is the amount of slip $Sv^{}$ for each wheel on the basis of the wheel speed $Vw^{**}$ and the estimated vehicle speed $Vso$, which are calculated at Steps 102 and 103, respectively, in accordance with the following equation:

$$Sv^{}=Vw^{}-Vso$$

Next, at Step 105, it is determined if there is a brake-input. That is, it is determined whether the brake pedal BP has been depressed, or not.

The program further proceeds to step 106, where it is determined if a condition for allowing the traction control has been fulfilled. That is, an allowance determination is made. Then, a condition for starting the traction control for a certain wheel $$ is determined at Step 107, and a condition for terminating the traction control is determined at Step 108. Furthermore, a condition for initiating a specific control for terminating the traction control (hereinafter, referred to as specific termination control) is determined at Step 109, and a condition for ending the specific termination control is determined at Step 110. Accordingly, a pressure mode for the wheel brake cylinder of the wheel $$ is set at Step 111, and a signal for controlling a solenoid is output in accordance with the pressure mode at Step 112 thereby to control the wheel brake cylinder pressure. The specific termination control as described above is a control for communicating the wheel brake cylinder with the pressure generator in accordance with a predetermined order, so as to reduce the hydraulic braking pressure remained in the wheel brake cylinder, properly, when the traction control is terminated.

Figure 5:
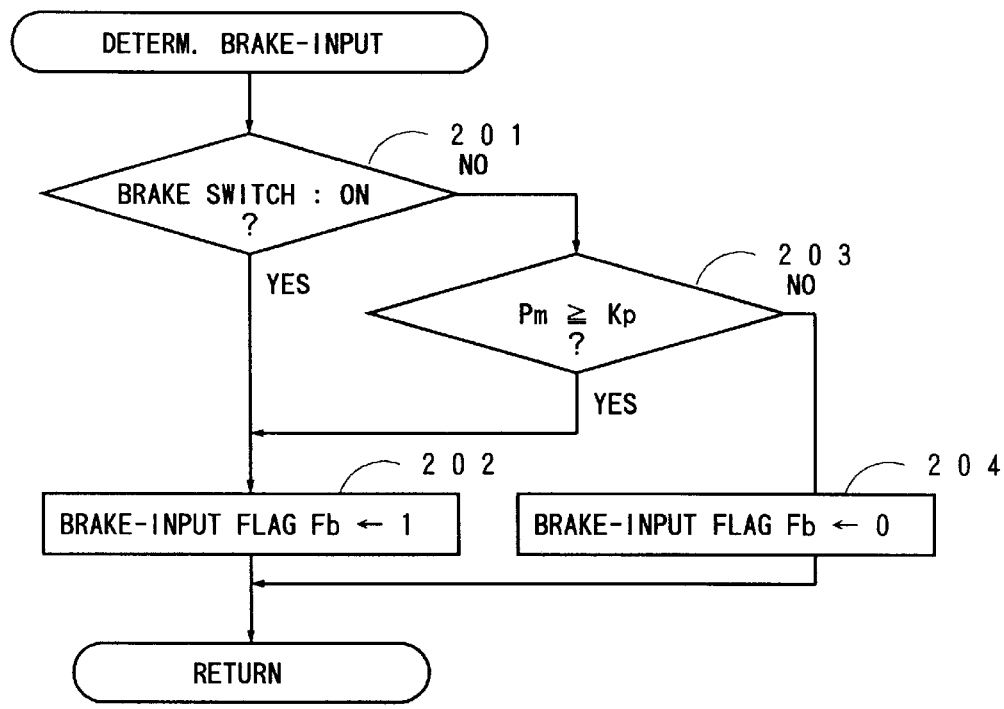
FIG. 5 is a flowchart showing a sub-routine for determining a brake-input in the traction control performed in the flowchart as shown in FIG. 4.

FIG. 5 shows the determination of the brake-input executed at Step 105 as shown in FIG. 4. At Step 201, it is determined whether the brake switch BS is "on" or "off". If it is determined that the brake switch BS is "on", i.e., when the brake pedal BP is depressed, the program further proceeds to Step 202, where a brake-input flag Fb is set to "1". If the brake switch BS has been turned off, the program proceeds to Step 203, where master cylinder pressure Pm detected by the pressure sensor PS is compared with a predetermined value Kp. When it is determined at Step 203 that the master cylinder pressure Pm is equal to or greater than the predetermined value Kp, the program proceeds to Step 202, where the brake-input flag Fb is set to "1", even if the brake switch BS is "off". For example, in the case where the communication between all of the wheel brake cylinders and the pressure generator PG has been shut off, the operation of the brake pedal BP can be detected by the increase of the master cylinder pressure Pm, even if the brake switch BS is held to be "off" irrespective of the operation of the brake pedal BP. Accordingly, when the brake switch BS is "off" and the master cylinder pressure Pm is less than the predetermined value Kp, the brake-input flag Fb is reset to be "0" at Step 204.

Figure 6:
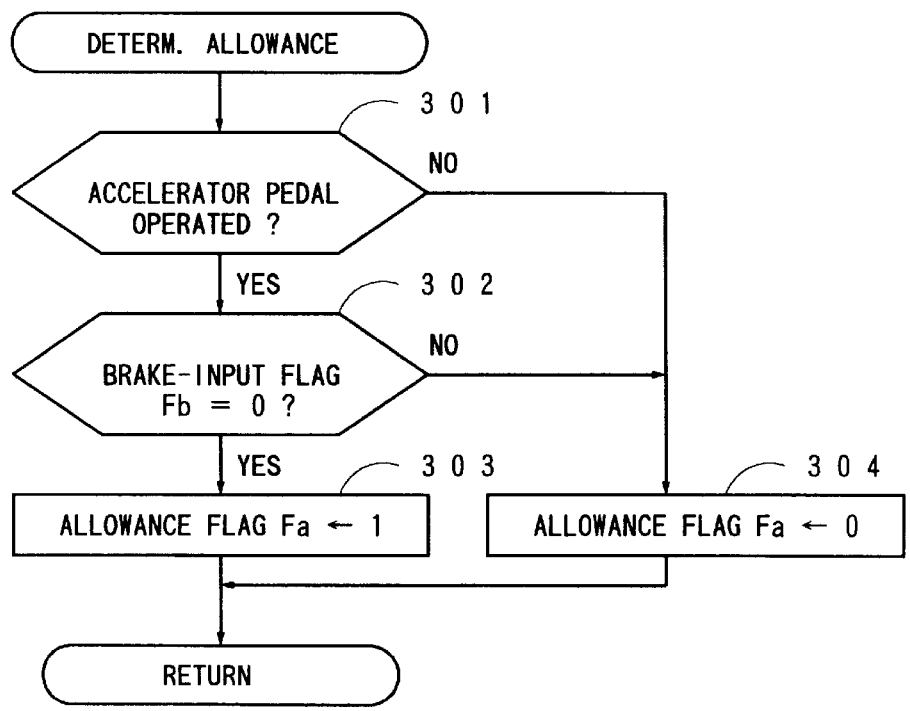
FIG. 6 is a flowchart showing a sub-routine for determining allowance of the traction control performed in the flowchart as shown in FIG. 4.

FIG. 6 shows the allowance determination of the traction control executed at Step 106 as shown in FIG. 4. At Step 301, it is determined whether the accelerator pedal AP has been depressed, or not. If it is determined that the accelerator pedal AP has been depressed, the program proceeds to Step 302, where the brake-input flag Fb is determined. If the brake-input flag Fb has not been set, the program proceeds to Step 303, where an allowance flag Fa for the traction control is set to "1". Therefore, when the accelerator pedal AP has not been depressed, or when the brake pedal BP has been depressed to set the brake-input flag Fb, the program proceeds to Step 304, where the allowance flag Fa is reset to be "0", so that the traction control will not be initiated.

Figure 7:
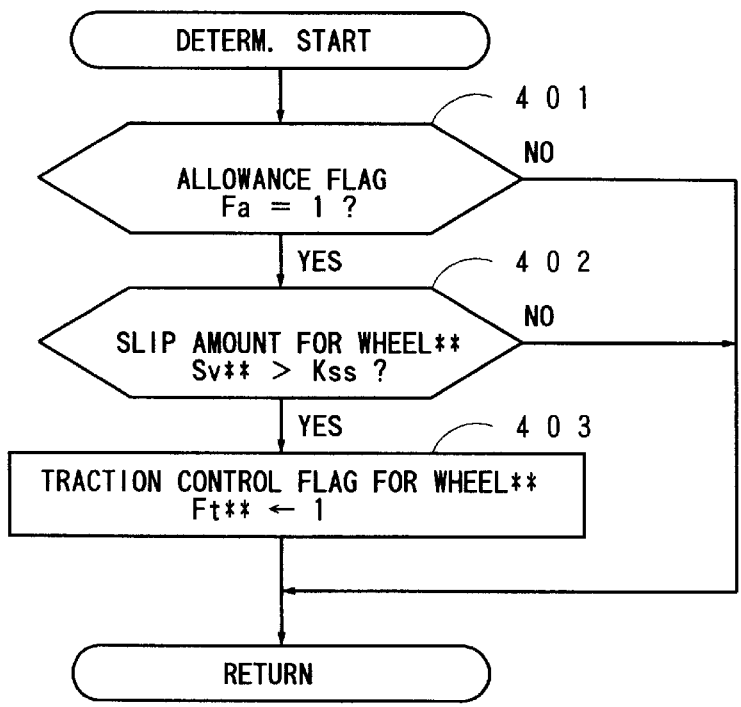
FIG. 7 is a flowchart showing a sub-routine for determining start of the traction control performed in the flowchart as shown in FIG. 4.

FIG. 7 shows the determination of starting the traction control executed at Step 107 as shown in FIG. 4. At Step 401, the allowance flag Fa for a certain wheel  is determined. If it is determined that the allowance flag Fa has not been set, the program returns to the main routine. Whereas, if it is determined that the allowance flag Fa has been set, the program proceeds to Step 402, where slip amount Sv for the wheel  is compared with a predetermined amount Kss. If it is determined that the slip amount Sv is equal to or less than the predetermined amount Kss, the program returns to the main routine. Therefore, when the allowance flag has been set, and the slip amount Sv for the wheel  exceeds the predetermined amount Kss, it is determined that the traction control is to be started, so that a traction control flag Ft is set for the wheel  at Step 403.

Figure 8:
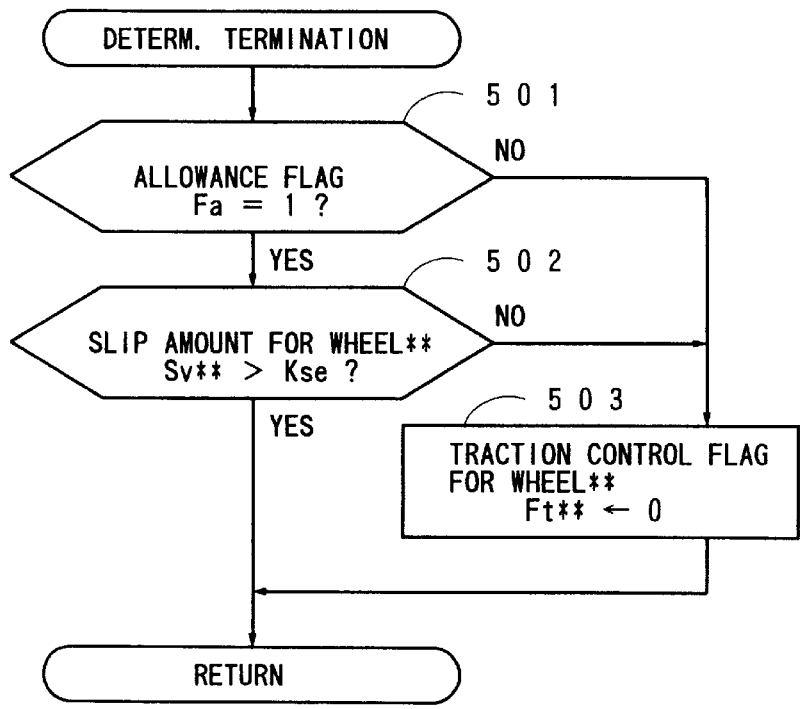
FIG. 8 is a flowchart showing a sub-routine for determining termination of the traction control performed in the flowchart as shown in FIG. 4.

FIG. 8 shows the determination of terminating the traction control executed at Step 108 as shown in FIG. 4. At Step 501, the allowance flag Fa for a certain wheel  is determined. If it is determined that the allowance flag Fa has been set, the program proceeds to Step 502, where the slip amount Sv for the wheel  is compared with a predetermined amount Kse (Normally, Kse is set to be less than Kss). If it is determined that the slip amount Sv exceeds the predetermined amount Kse, the program returns to the main routine, so that the traction control is continued. Therefore, when the allowance flag has been reset for the wheel , or the slip amount Sv for the wheel  is equal to or less than the predetermined amount Kse, it is determined that the traction control is to be terminated, so that the traction control flag Ft for the wheel ** is reset at Step 503.

Figure 9:
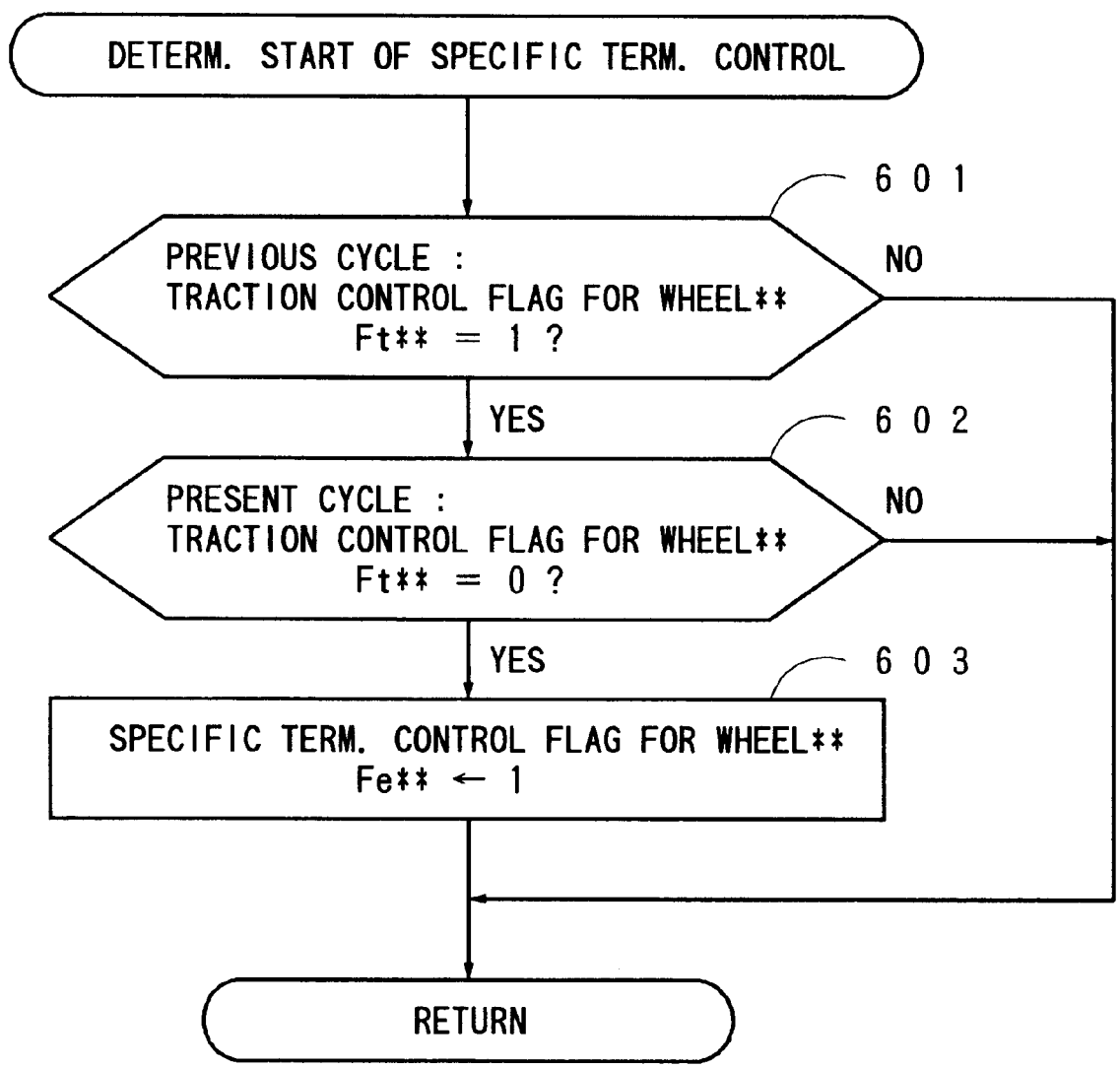
FIG. 9 is a flowchart showing a sub-routine for determining start of a specific terminating control in the traction control performed in the flowchart as shown in FIG. 4.

FIG. 9 shows the determination of starting the specific termination control executed at Step 109 as shown in FIG. 4. At Step 601, the traction control flag Ft for a certain wheel  at the previous cycle is determined. If the traction control flag Ft was set at the previous cycle, the program proceeds to Step 602 where the traction control flag Ft at the present cycle is determined. If it is determined that the traction control flag Ft, which was set at the previous cycle, has been reset at the present cycle, it means that the traction control has just ended, so that the program proceeds to Step 603 where a specific termination control flag Fe for the wheel  is set. In the case where the traction control flag Ft was not set at the previous cycle, or it has been set at the present cycle, then the program returns to the main routine.

Figure 10:
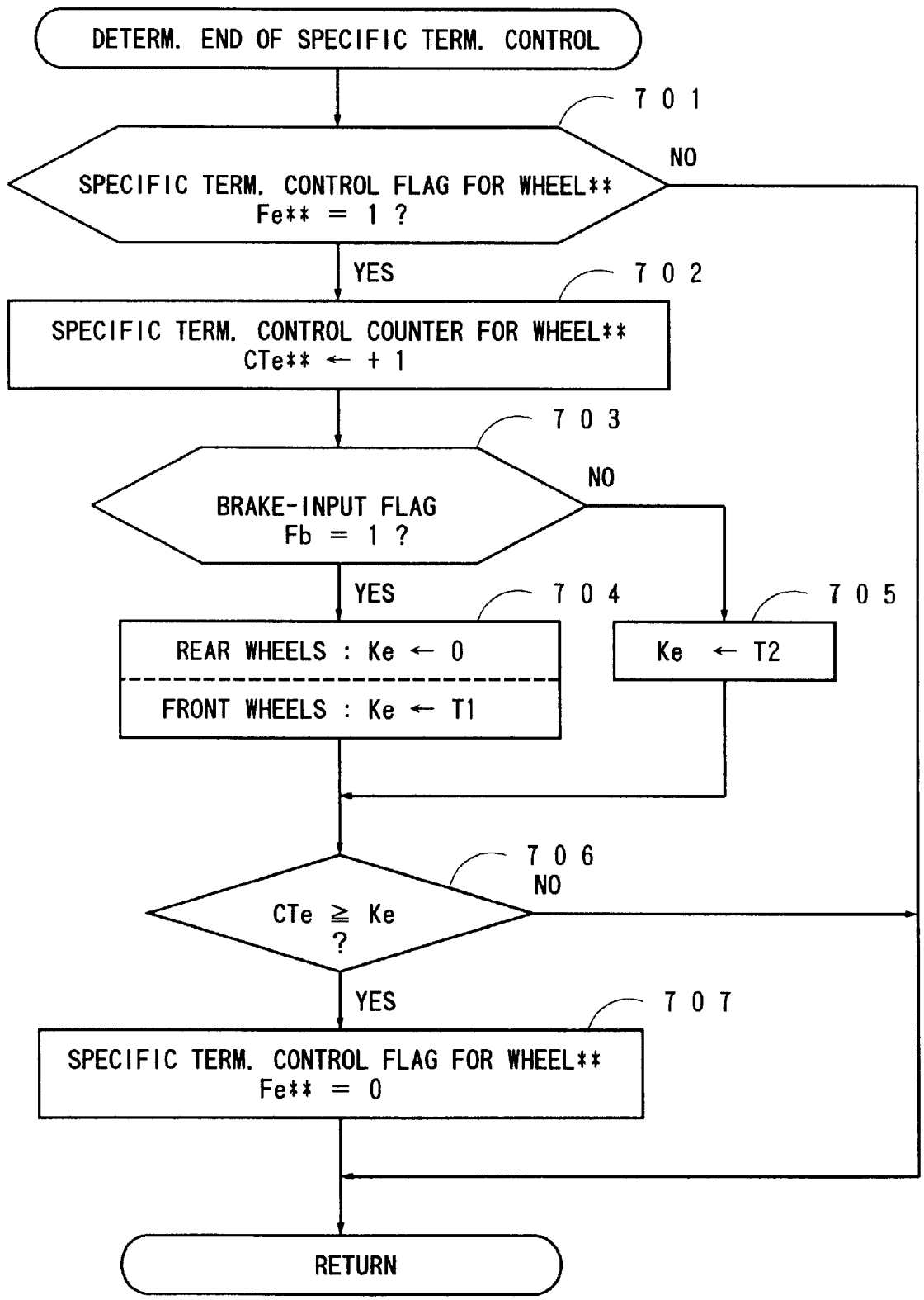
FIG. 10 is a flowchart showing a sub-routine for determining termination of the specific terminating control in the traction control performed in the flowchart as shown in FIG. 4.

FIG. 10 shows the determination of ending the specific termination control executed at Step 110 as shown in FIG. 4. At Step 701, the specific termination control flag Fe for a certain wheel  is determined. If the specific termination control flag Fe has not been set, the program returns to the main routine. If the specific termination control flag Fe has been set, the program proceeds to Step 702 where a specific termination control counter Cte for the wheel  is incremented (+1), and further proceeds to Step 703, where the brake-input flag Fb is determined. If it is determined that the brake-input flag Fb has been set, i.e., if it is determined that the brake pedal BP was depressed, then the program proceeds to Step 704, where a delay time Ke is set to zero for the rear wheel brake cylinders which are connected to the regulator RG, while the delay time Ke is set to a predetermined time T1 (e.g., 30 ms) for the front wheel brake cylinders which are connected to the master cylinder MC. In the case where the brake-input flag Fb has not been set, the program proceeds to Step 705, where the delay time Ke is set to a predetermined time T2 (longer than T1, e.g., 500 ms) for all of the wheel brake cylinders. Then, the program proceeds to Step 706, where a value counted by the specific termination control counter Cte is compared with a value corresponding to the delay time Ke. If it is determined that the value counted by the specific termination control counter Cte is equal to or greater than the value corresponding to the delay time Ke, the program proceeds to Step 707, where the specific termination control flag Fe for the wheel  is reset. Whereas, if the value counted by the specific termination control counter Cte** has not reached yet to the value corresponding to the delay time Ke, the program returns to the main routine.

Accordingly, when the brake-input flag Fb is set at Step 703, the specific termination control flag Fe is immediately reset for the rear wheel brake cylinders, which are connected to the regulator RG. With the predetermined time T1 elapsed thereafter, it will be reset for the front wheel brake cylinders, which are connected to the master cylinder MC. If the brake-input flag Fb has not been set, the specific termination control flag Fe is reset for all of the wheel brake cylinders, after the predetermined time T2 (>T1) elapsed.

Figure 11:
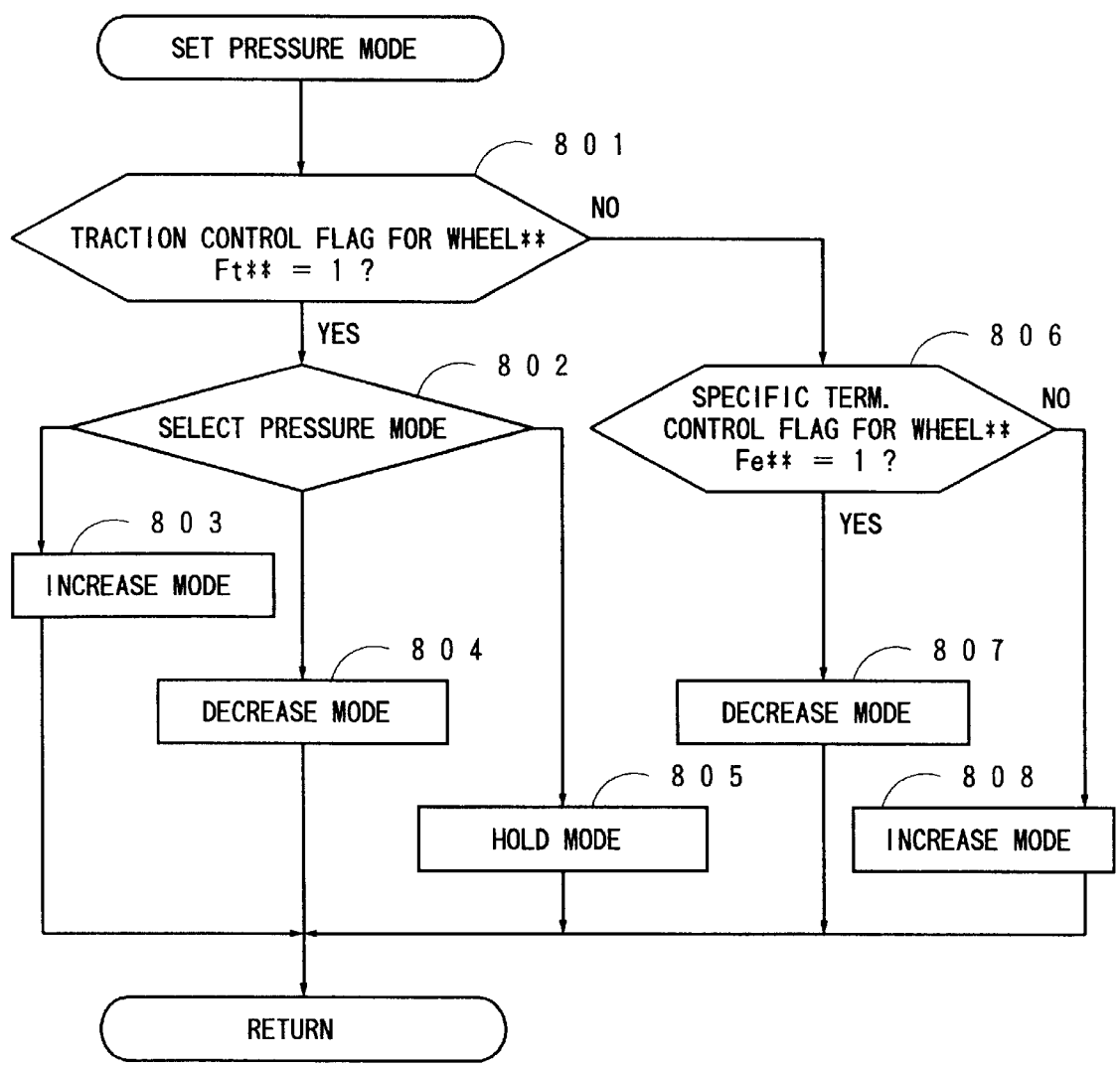
FIG. 11 is a flowchart showing a sub-routine for setting pressure modes in the traction control performed in the flowchart as shown in FIG. 4.

FIG. 11 shows a sub-routine for setting a pressure mode executed at Step 111 as shown in FIG. 4. At the outset, the traction control flag Ft for a certain wheel  is determined at Step 801. If the traction control flag Ft has been set, the program proceeds to Step 802, where one of the pressure modes is selected in accordance with the accelerating slip condition of the wheel . As a result, the program proceeds to one of Steps 803, 804 and 805, where one of the pressure increase mode, pressure decrease mode and hold mode is set, respectively. In the case where the traction control flag Ft has not been set, the program proceeds to Step 806, where the specific termination control flag Fe for the wheel  is determined. If the specific termination control flag Fe has been set, the pressure decrease mode is set at Step 807, so that the wheel brake cylinder pressure, which was increased during the traction control, is reduced. If the specific termination control flag Fe has not been set, the pressure increase mode is set at Step 808**, as in the ordinary braking operation.

Figure 12:
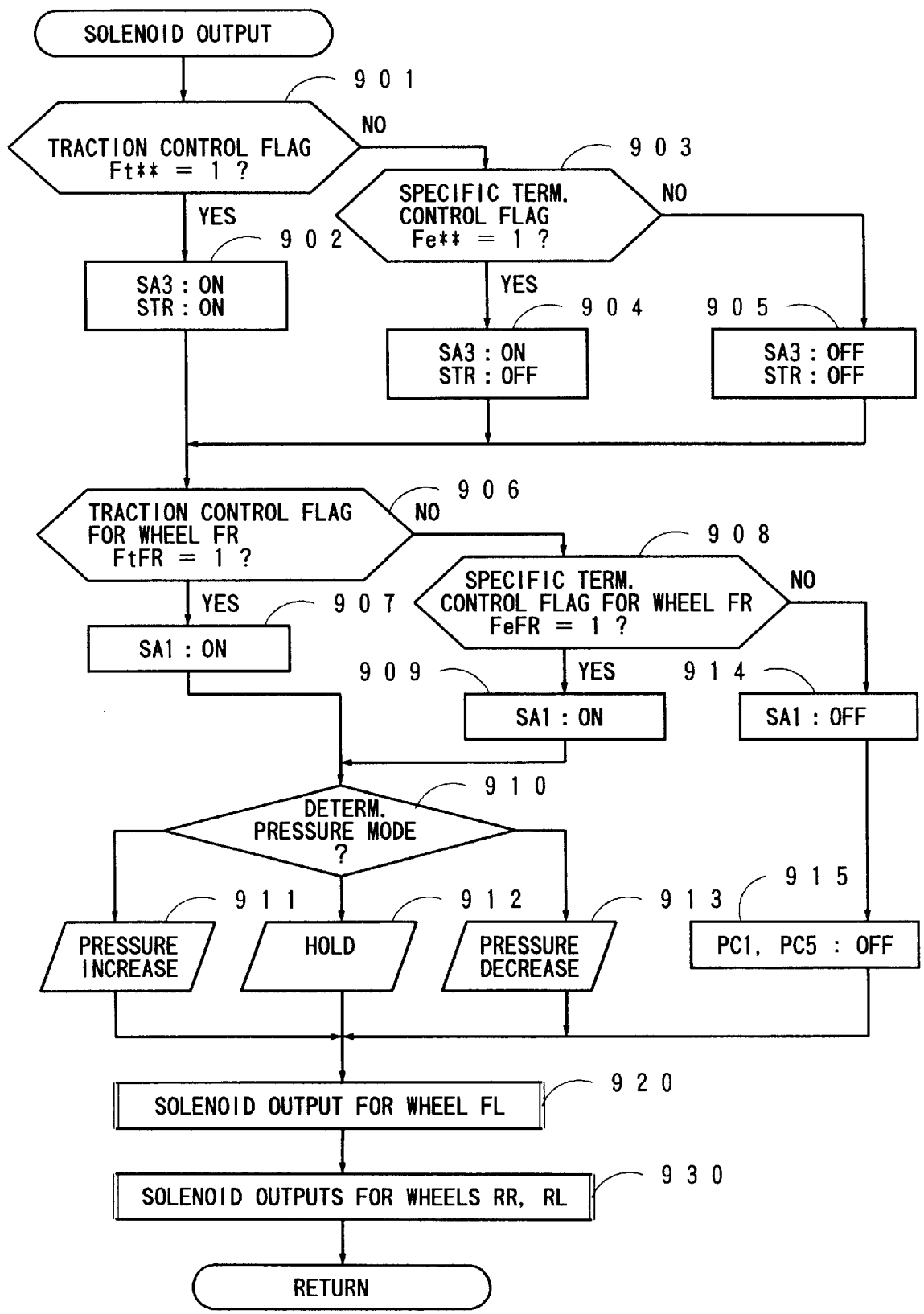
FIG. 12 is a flowchart showing a sub-routine for solenoid output in the traction control performed in the flowchart as shown in FIG. 4.

FIG. 12 shows a sub-routine for solenoid output executed at Step 112 as shown in FIG. 4. At the outset, the traction control flag Ft for a certain wheel  is determined at Step 901. If the traction control flag Ft has been set, the program proceeds to Step 902, where the solenoid valves SA3, STR are turned on, so that the traction control for the wheel  is performed. Whereas, if the traction control flag Ft has not been set, the program proceeds to Step 903, where the specific termination control flag Fe for the wheel  is determined. Then, if it is determined that the specific termination control flag Fe has been set, the program proceeds to Step 904, where the solenoid valve SA3 is turned on, while the solenoid valve STR is turned off. In the case where the specific termination control flag Fe has not been set, the program proceeds to Step 905, where the solenoid valves SA3 and STR are turned off, as shown in FIG. 3**, so that the rear wheel brake cylinders Wrl, Wrr are communicated with the regulator RG.

Accordingly, when the brake pedal BP is depressed during the traction control, the rear wheel brake cylinders Wrl, Wrr are communicated with the regulator RG at first, then, with the predetermined time T1 elapsed, the solenoid valves SA1, SA2 for the front wheels are turned off, as described later. Therefore, even if the hydraulic braking pressure in the wheel brake cylinder had been high when the traction control was terminated, the hydraulic braking pressure would not be supplied immediately thereafter to the master cylinder MC, but it would be supplied to the master cylinder MC after it was supplied to the regulator RG. As a result, the load applied from the wheel brake cylinders to the master cylinder MC would be reduced to a great extent, so that the components of the master cylinder MC would not be damaged. With respect to the regulator RG, however, it has such structure that it would not be damaged, even if the pressure in the wheel brake cylinder was increased high.

Then, the pressure mode for the wheel FR, for example, is set at Steps 906–915. First, it is determined at Step 906 whether the traction control flag FtFR has been set, or not. If the traction control flag FtFR has been set, the program proceeds to Step 907, where the solenoid valve SA1 is turned on, so that the communication between the wheel brake cylinder Wfr and the master cylinder MC is blocked, and that the wheel brake cylinder Wfr is communicated with the auxiliary pressure source AS. Then, the program proceeds to Step 910, where the pressure mode is determined in accordance with the accelerating slip condition, to select the pressure increase mode at Step 911, the hold mode at Step 912, or the pressure decrease mode at Step 913.

Whereas, if it is determined at Step 906 that the traction control flag FtFR has not been set with respect to the wheel FR, the program proceeds to Step 908, where it is determined whether the specific termination control flag FeFR for the wheel FR has been set, or not. Then, if it is determined that the specific termination control flag FeFR has been set, the program proceeds to Step 909, where the solenoid valve SA1 is turned on. In the case where the specific termination control flag FeFR has not been set, the program proceeds to Step 914, where the solenoid valve SA1 is turned off, and further proceeds to Step 915, where the solenoid valves PC1, PC5 are turned off. Likewise, at Step 920, one of the pressure modes for the wheel brake cylinder Wfl of the wheel FL is set, and signals for driving the solenoids in accordance therewith are output. Furthermore, at Step 930, the pressure modes are set for the wheels RR, RL, and the signals for driving the solenoids are output.

According to the above-described embodiment, the determination of the brake-input is based upon the output of the brake switch BS and the pressure discharged from the master cylinder MC as shown in FIG. 5. By means of a pedal depressing force sensor (as indicated in FIG. 1) for detecting a depressing force applied to the brake pedal BP, it may be determined that the brake pedal BP was depressed, when the sensor detected the depressing force greater than a predetermined force. Thus, either means can detect the operation of the brake pedal BP properly, even in the case where the traction control is being performed on condition that the communication between all of the wheel brake cylinders and both of the master cylinder MC and regulator RG is blocked.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A traction control system for controlling a braking force applied to front and rear wheels of a four-wheel drive vehicle, comprising:

wheel brake cylinders operatively mounted on said front and rear wheels, respectively, for applying a braking force thereto;

a hydraulic pressure generator for supplying a hydraulic braking pressure to each of said wheel brake cylinders in response to operation of a brake pedal;

an auxiliary pressure source for generating the hydraulic braking pressure independently of said hydraulic pressure generator;

a hydraulic braking pressure control apparatus disposed between said wheel brake cylinders and both of said hydraulic pressure generator and said auxiliary pressure source for controlling the hydraulic braking pressure in each wheel brake cylinder;

braking operation detection means for detecting operation of said brake pedal;

accelerating operation detection means for detecting operation of an accelerator pedal of said vehicle;

slip detection means for detecting a slip of each wheel of said vehicle;

braking force controlling means for controlling said hydraulic braking pressure control apparatus to perform a traction control by supplying the hydraulic braking pressure discharged from said auxiliary pressure source to said wheel brake cylinders mounted on said wheels under a slip condition, when said accelerating operation detection means detects the operation of said accelerator pedal and said slip detection means detects the slip of at least one of said wheels, said braking force controlling means controlling said hydraulic braking pressure control apparatus to communicate all of said wheel brake cylinders with said hydraulic pressure generator, when said braking operation detection means detects the operation of said brake pedal on condition that the traction control is being performed, with the communication between said pressure generator and all of said wheel brake cylinders blocked.

2. A traction control system as set forth in claim 1, wherein said hydraulic pressure generator includes a master cylinder for supplying the hydraulic braking pressure to each of said wheel brake cylinders in response to operation of said brake pedal, and wherein said braking operation detection means includes a pressure sensor for detecting the hydraulic braking pressure discharged from said master cylinder, and detects the operation of said brake pedal by said pressure sensor, when the hydraulic braking pressure detected thereby exceeds a predetermined pressure.

3. A traction control system as set forth in claim 2, wherein said braking operation detection means further includes a brake switch which is turned on in response to operation of said brake pedal, and detects the operation of said brake pedal by said brake switch and said pressure sensor, when said brake switch is turned on, and the hydraulic braking pressure detected by said pressure sensor exceeds the predetermined pressure.

4. A traction control system as set forth in claim 1, wherein said braking operation detection means includes depressing force detection means for detecting a depressing force applied to said brake pedal, and detects the operation of said brake pedal by said depressing force detection means, when the depressing force detected thereby exceeds a predetermined force.

5. A traction control system as set forth in claim 1, further comprising wheel speed sensors for detecting wheel speeds of said wheels, and means for calculating an estimated vehicle speed on the basis of the wheel speeds, wherein said slip detection means includes slip amount calculating means for calculating the amount of slip on the basis of the wheel speeds and the estimated vehicle speed, and detects the slip of each wheel, when the amount of slip detected by said slip amount calculating means exceeds a predetermined amount.

6. A traction control system as set forth in claim 1, wherein said hydraulic pressure generator includes a master cylinder for supplying the hydraulic braking pressure to each of said wheel brake cylinders in response to operation of said brake pedal, and a regulator for regulating the hydraulic pressure discharged from said auxiliary pressure source in response to operation of said brake pedal, wherein said wheel brake cylinders are arranged to provide a front and rear dual circuit system, wherein one circuit thereof is communicated with said master cylinder, and the other one circuit thereof is communicated with said regulator, and wherein said braking force controlling means controls said braking pressure control apparatus to communicate the other one circuit with said regulator at first, and with a predetermined time elapsed thereafter, communicate the one circuit with said master cylinder, when said braking operation detection means detects the operation of said brake pedal on condition that the traction control is being performed, with the communication between said pressure generator and all of said wheel brake cylinders blocked.

* * * * *